(12) United States Patent
Madeyski (10) Patent No.: US 10,489,798 B1
(45) Date of Patent: Nov. 26, 2019

(54) INSURANCE LEAD MARKETPLACE

(71) Applicant: Allstate Insurance Company, Northbrook, IL (US)

(72) Inventor: Mark Madeyski, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 854 days.

(21) Appl. No.: 14/457,763

(22) Filed: Aug. 12, 2014

Related U.S. Application Data (60) Provisional application No. 61/864,978, filed on Aug. 12, 2013.

(51) Int. Cl.
  *G06Q 40/08* (2012.01)
  *G06Q 30/02* (2012.01)

(52) U.S. Cl.
  CPC ......... *G06Q 30/0201* (2013.01); *G06Q 40/08* (2013.01)

(58) Field of Classification Search
  USPC .......................................................... 705/4
  See application file for complete search history.

(56) References Cited

U.S. PATENT DOCUMENTS

| | | | |
|---|---|---|---|
| 2004/0143476 A1* | 7/2004 | Kapadia | G06Q 30/02 705/500 |
| 2006/0200383 A1* | 9/2006 | Arutunian | G06Q 30/02 705/14.56 |
| 2011/0264479 A1* | 10/2011 | Birr | G06Q 10/06311 705/7.13 |
| 2013/0246914 A1* | 9/2013 | Millefiorini | G06Q 10/10 715/268 |

* cited by examiner

*Primary Examiner* — Lindsay M Maguire
*Assistant Examiner* — Ambreen A. Alladin
(74) *Attorney, Agent, or Firm* — Banner & Witcoff, Ltd.

(57) ABSTRACT

An insurance lead marketplace may include an insurance lead marketplace computing device that includes a non-transitory memory device and/or a processor. The non-transitory memory device may be configured for storing one or more rules for qualifying and/or categorizing insurance leads based on at least one insurance characteristic. The processor may be configured to provide insurance leads that were received from an insurance lead source to a requesting agent, to determine a quality associated with and/or categorize each insurance lead based on one or more characteristics of the received insurance leads, to present the insurance leads to an insurance agent based on one or more selected lead characteristics and/or lead tiers, and/or to determine information associated with an actual quality of each insurance lead based upon feedback received from the agent and revise rules for qualifying and/or categorizing the insurance leads using the actual quality of the insurance leads.

19 Claims, 5 Drawing Sheets

INSURANCE LEAD MARKETPLACE

PRIORITY

This application claims priority to U.S. Prov. Pat. App. No. 61/864,978 filed on Aug. 12, 2013 and entitled "Insurance Lead Marketplace", which is incorporated herein by reference in its entirety for any and all non-limiting purposes.

TECHNICAL FIELD

Various aspects of the disclosure generally relate to systems and methods of obtaining insurance leads, qualifying the insurance leads and the suppliers of the insurance leads using characteristics of the insurance leads and providing the insurance leads to one or more agents based at least in part on characteristics associated with the agents.

BACKGROUND

Many people seeking insurance coverage (e.g., life insurance, homeowner insurance, automobile insurance, boat insurance, health insurance, etc.) will conduct at least a portion of their search over the Internet. Often, however, a local insurance agency may not have a large enough Internet presence capable of providing the information that these people seek. Instead, insurance seekers may look to other Internet sources for their insurance needs. For example, companies (e.g., a lead generation company, an insurance lead supplier, etc.) may be used to provide information about different available insurance products, and in turn, create an insurance lead by collecting data from the insurance seeker. These insurance leads may then be sold to one or more insurance agents and/or insurance agencies. While this may be a useful system model, often problems may arise. For instance, an insurance agent and/or insurance agency may not be able to properly vet their insurance lead supplier. In such cases, the insurance agents may purchase one or more false leads and/or an outdated insurance lead, while actual insurance leads are not sold or ignored.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, device, computer-implemented methods, and computer-readable media to provide an insurance lead marketplace. For example, the insurance lead marketplace may include an insurance lead marketplace computing device that includes a non-transitory memory device and/or a processor. The non-transitory memory device may be configured for storing one or more rules for qualifying and/or categorizing insurance leads based on at least one insurance characteristic. The processor may be capable of providing insurance leads to a requesting agent. The processor may be configured to receive one or more insurance leads from one or more insurance lead sources and analyze the received insurance leads to determine one or more characteristics of the received insurance leads. The processor may determine a quality associated with each insurance lead and the quality of a particular insurance lead may be at least dependent on the age of that insurance lead. The processor may classify the insurance leads into tiers based on the quality of each insurance lead. The processor may then categorize the insurance leads within each tier using the rules and the determined characteristics. The processor may be configured to provide an interface to the requesting insurance agent, wherein the insurance agent may select one or more lead characteristics to specify a desired insurance lead category and/or a desired lead tier. The processor may provide one or more leads that match the desired insurance lead category and/or the lead tier to the requesting insurance agent based on the desired insurance lead category and/or desired lead tier. The processor may determine information associated with an actual quality of each insurance lead based at least in part upon feedback received from the agent and revise the rules for qualifying and/or categorizing the insurance leads using the actual quality of one or more insurance leads provided to an agent.

In accordance with additional aspects of the disclosure, there can be various devices and systems, such as an insurance lead marketplace system. The insurance lead marketplace system may include a data repository having at least one non-transitory memory device, where the data repository storing one or more available insurance leads received from an insurance lead source. An insurance lead marketplace computer device may be communicatively coupled to the data repository. The insurance lead marketplace computing device may include a processor configured to categorize the one or more insurance leads into quality tiers based on characteristics associated with the insurance leads. A user interface may be communicatively coupled to the data repository and/or the insurance lead marketplace computer device. The user interface may be configured to display one or more screens to facilitate a request for insurance leads from an insurance agent based on one or more desired characteristics of the insurance leads. The insurance lead marketplace computer device may provide real-time verification of the insurance leads by determining a number of the available insurance leads that match characteristics specified in a request for insurance leads received via the user interface screen.

In accordance with additional aspects of the disclosure, various devices and systems may be used to implement a method for providing qualified insurance leads to an insurance agent. The method may include receiving, at an insurance lead marketplace computing device, one or more insurance leads from an insurance lead source and verifying, by the insurance lead marketplace computing device, the one or more insurance leads and assigning each of the one or more insurance leads to a quality tier using insurance lead qualification rules stored in a data repository. The method may be used for receiving, via a user interface, a request for insurance leads from an insurance agent, the request including a quality tier and/or one or more desired lead characteristics and determining, by the insurance lead marketplace computing device, whether any of the verified insurance leads match the requested quality tier and/or desired lead characteristics. Responsive to the determining, the method may be used for providing the matched insurance leads to the insurance agent via the user interface and adjusting, by the insurance lead marketplace computing device, the insurance lead qualifying rules using feedback received from the insurance agent associated with an outcome of the provided insurance leads.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
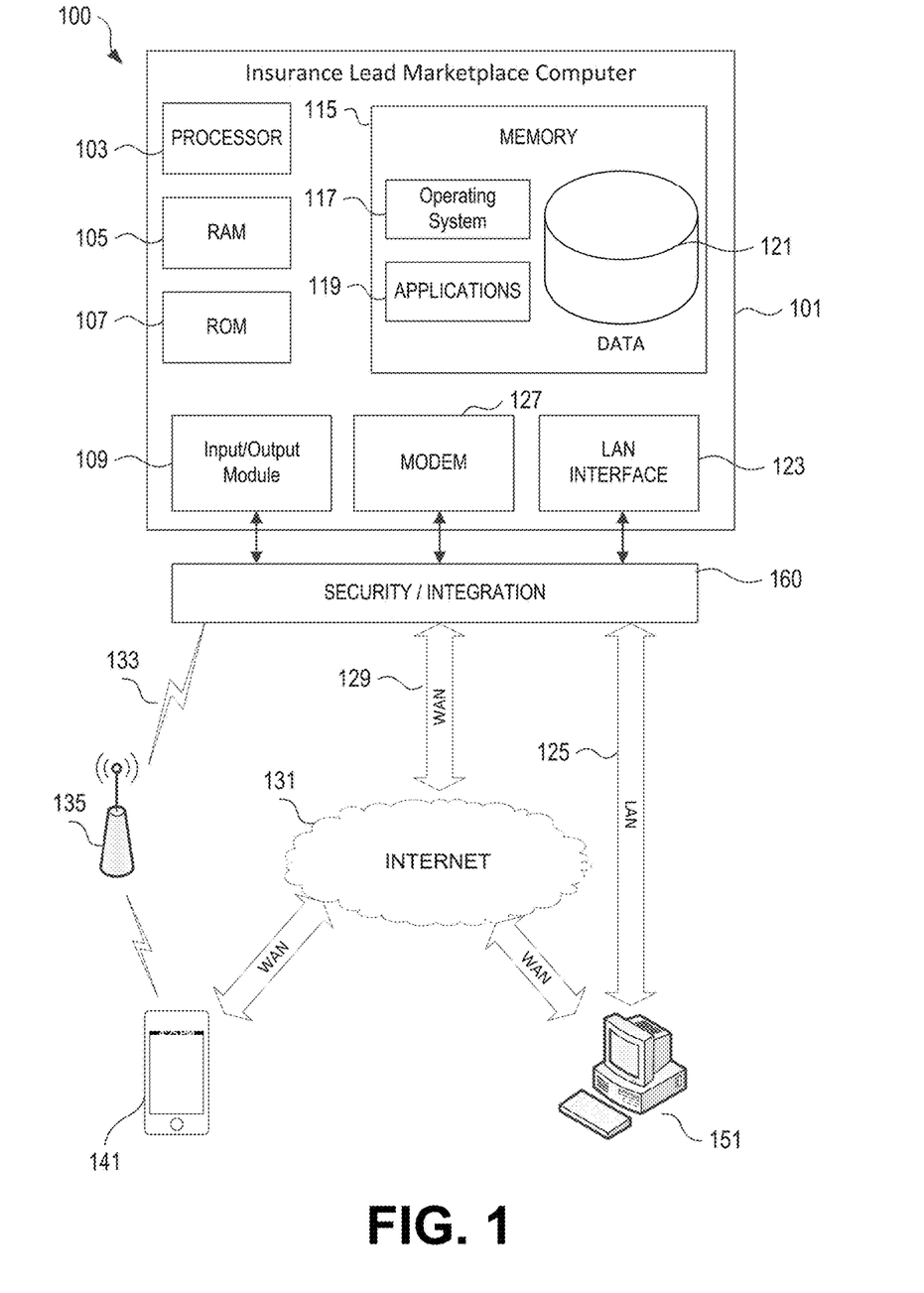
FIG. 1 illustrates a network environment and computer systems that may be used to implement aspects of the insurance lead marketplace system.

FIG. 1 illustrates a block diagram of a computing device (or system) 101 (e.g., an insurance lead marketplace computing device) in a computer system 100 (e.g., an insurance lead marketplace system) that may be used according to one or more illustrative embodiments of the disclosure. The computing device 101 may have a processor 103 for controlling overall operation of the computing device 101 and its associated components, including one or more memory units (e.g., RAM 105, ROM 107), an input/output module 109, and a memory 115. The computing device 101, along with one or more additional devices (e.g., terminals 141 and 151, security and integration hardware 160) may correspond to any of multiple systems or devices, such as an insurance lead marketplace system and/or an insurance lead marketplace system configured as described herein for receiving and/or qualifying one or more insurance leads obtained from a lead supplier, categorizing the insurance leads into one or more quality tiers and/or categories (e.g., a life insurance lead, a homeowner insurance lead, an automobile insurance lead, a boat insurance lead, and the like), providing the one or more insurance leads to an insurance agent and/or an insurance agency and/or adjusting one or more rules for qualifying the insurance leads and/or the insurance lead suppliers using information about the insurance leads provided to the agent and/or agency.

The Input/Output system (I/O) 109 may include one or more user interfaces, such as a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the system 101 to execute a series of computer-readable instructions, for example, to receive one or more insurance leads from an insurance lead source, verify the one or more insurance leads and assigning each of the one or more insurance leads to a quality tier using insurance lead qualification rules stored in a data repository, receive a request for insurance leads from an insurance agent, the request including a quality tier and/or one or more desired lead characteristics, determine whether any of the verified insurance leads match the requested quality tier and/or desired lead characteristics, provide the matched insurance leads to the insurance agent via the user interface, adjust the insurance lead qualifying rules using feedback received from the insurance agent associated with an outcome of the provided insurance leads. In some cases, the instructions may be configured to cause the processor 103 to determine a price associated with each of the one or more insurance leads, the price corresponding to the quality tier of each insurance lead, wherein the price may depend on one or more characteristics of each insurance lead.

The insurance lead marketplace computing device (e.g., a customer terminal, an insurance provider computer hardware memory and processor system, an insurance clearinghouse computer memory and processor device, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. In some cases, the terminals 141, 151 may be located at one or more different geographic locations, including, but not limited to, at a site associated with an insurance agent and/or agency, a site associated with an insurance provider, and/or a site associated with a lead supplier. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless network 133.

Also illustrated in FIG. 1 is a security and integration layer 160, through which communications may be sent and managed between the insurance lead marketplace computing device 101 and the remote devices (141 and 151) and remote networks (125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the insurance lead marketplace computing device 101 (e.g., one or more servers, a workstation, etc.) from external devices 141 and 151. In some cases, the security and integration layer 160 may correspond to a set of dedicated hardware and/or software operating at the same physical location and under the control of same entities as the insurance lead marketplace computing device 101. For example, the layer 160 may correspond to one or more dedicated web servers and network hardware in an insurance lead marketplace datacenter or in a cloud infrastructure supporting a cloud-based insurance lead marketplace. In other examples, the security and integration layer 160 may correspond to separate hardware and software components which may be operated at a separate physical location and/or by a separate entity.

In some cases, the data transferred to and from the insurance lead marketplace computing device 101 in the insurance lead marketplace may include secure and sensitive data, such as insurance customer and policy data. In some cases, the insurance lead marketplace may be accessed by invitation only, such that the insurance lead marketplace computing device 101 may be accessed by one or more insurance agents and/or agencies via a secure connection. Therefore, it may be desirable to protect the data transmission by using secure network protocols and encryption, and also to protect the integrity of the data stored when on the insurance lead marketplace device 101 using the security and integration layer 160 to authenticate users and restrict access to unknown or unauthorized users. In various implementations, security and integration layer 160 may provide, for example, a file-based integration scheme or a service-based integration scheme. In field-based integration, data files may be transmitted to and from the insurance lead marketplace device 101 through the security and integration layer 160, using various network communication protocols. Secure data transmission protocols and/or encryption may be used in file transfers to protect the integrity of the insurance lead marketplace data, for example, File Transfer Protocol (FTP), Secure File Transfer Protocol (SFTP), and/or Pretty Good Privacy (PGP) encryption.

In service-based integration, one or more web services may be implemented within the insurance lead marketplace system 100 between the insurance lead marketplace device 101 and/or security and integration layer 160. The web services may be accessed by authorized external devices and users to support input, extraction, and manipulation of the data in the insurance lead marketplace computing device 101. Web services built to provide support to the insurance lead marketplace may be cross-domain and/or cross-platform, and may be built for enterprise use. Such web services may be developed in accordance with various web service standards, such as the Web Service Interoperability (WS-I) guidelines. In some examples, the insurance lead marketplace web service may be implemented in the security and integration layer 160 using the Secure Sockets Layer (SSL) or Transport Layer Security (TLS) protocol to provide secure connections between the insurance lead marketplace computing device 101 and various clients 141 and 151 attempting to access, insert and/or manipulate data within the insurance lead marketplace. SSL or TLS may use HTTP or HTTPS to provide authentication and/or confidentiality. In some cases, the insurance lead marketplace web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the memory 115 or other components in the insurance lead marketplace system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., an insurance lead repository, a rules repository, a characteristics repository, etc.) may be cached in one or more separate smaller databases on an application server separate from the database server. For instance, in a multitiered application, a database cache on an application server can reduce data retrieval and data manipulation time by not needing to communicate over a network with a back-end database server. These types of caches and others may be included in various embodiments, and may provide potential advantages in certain implementations of the insurance lead marketplace system 100, such as faster response times and less dependence on network conditions when accessing the insurance lead marketplace to update, qualify, verify, categorize insurance leads within the insurance lead marketplace system 100, and/or to retrieve or otherwise distribute insurance leads to one or more insurance agents and/or agencies that may be requesting an insurance lead.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and life insurance clearinghouse system components described herein may be configured to communicate using any of these network protocols or technologies.

Additionally, one or more application programs 119, such as an insurance lead marketplace application, may be used by the insurance lead marketplace computing device 101 within the insurance lead marketplace system 100, including computer executable instructions for receiving, one or more insurance leads from an insurance lead source, verifying the one or more insurance leads and assigning each of the one or more insurance leads to a quality tier using insurance lead qualification rules stored in a data repository, receiving, such as via a user interface, a request for insurance leads from an insurance agent, the request including a quality tier and/or one or more desired lead characteristics, determining whether any of the verified insurance leads match the requested quality tier and/or desired lead characteristics, responsive to the determining, providing the matched insurance leads to the insurance agent via the user interface, adjusting, by the insurance lead marketplace computing device, the insurance lead qualifying rules using feedback received from the insurance agent associated with an outcome of the provided insurance leads. In some cases, the computer executable instructions may include instructions for determining a price associated with each of the one or more insurance leads, the price corresponding to the quality tier of each insurance lead and/or performing other related functions as described herein. In some cases, the insurance agent and/or agency may choose to view available leads by the price associated to each particular lead, lead category and/or lead tier.

Figure 2:
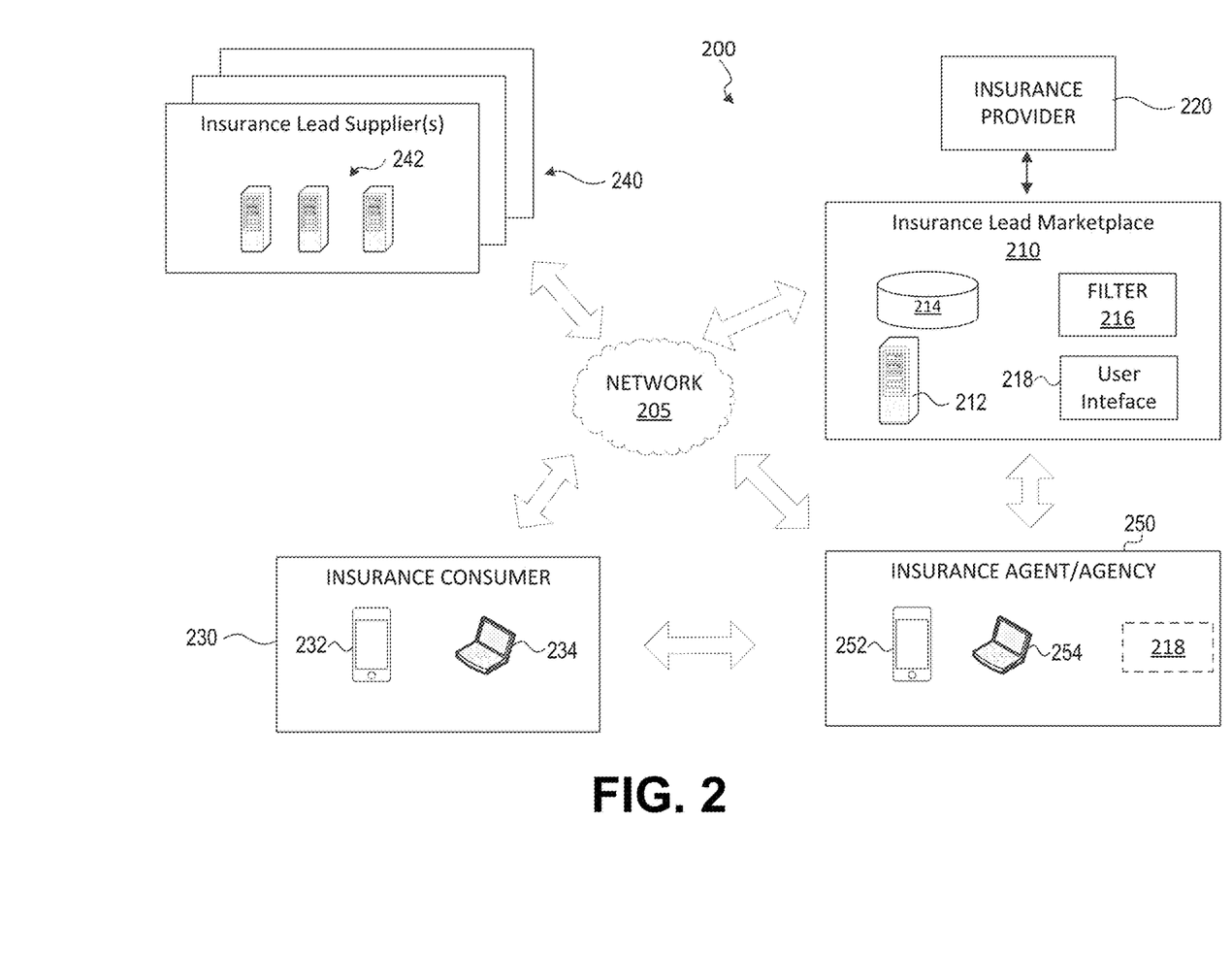
FIG. 2 is a diagram illustrating various components of an insurance lead marketplace system of FIG. 1, according to one or more aspects of the disclosure.

FIG. 2 is a diagram illustrating various components of the insurance lead marketplace system 100, according to one or more aspects of the disclosure. In an example, the insurance lead marketplace system may include an insurance lead marketplace computer device 210 that may be provided by an insurance provider 220. One or more insurance consumers 230 may request information about one or more insurance products over a network (e.g., the Internet) using one or more computing devices 232, 234 (e.g., a phone, a tablet device, a computer, etc.). These requests may be received by one or more insurance lead suppliers 240 and processed by one or more servers 242 into an insurance lead having one or more characteristics associated with the insurance consumer 230 that may be self-provided, inferred from other answers, and/or obtained from publicly available records. For example, the characteristics may include demographic information about the insurance consumer 230 (e.g., age, gender, income, automobile ownership, home ownership, rental, employment information, and the like), driving history, a credit rating, asset information, a desired timeframe for obtaining insurance coverage and/or information about existing or prior insurance coverage (e.g., a number of claims, duration of former coverage, any current insurance products, previous and/or current insurance providers). Once the insurance consumer 230 clicks, or otherwise selects to submit information to receive a quotation, the insurance consumer 230 may be prompted to enter personal information, information about a desired insurance product and/or information about any existing insurance coverage.

The insurance lead suppliers 240 may obtain insurance leads using a web page directed to soliciting quotations for insurance products, using ads (e.g., banner ads, static ads, dedicated websites, etc.) that may or may not be provided as part of a directed marketing campaign. In some cases, the insurance lead providers will filter or otherwise sort the obtained insurance leads using the characteristics entered by the insurance consumer 230. The insurance lead providers may then provide the insurance leads to the insurance lead marketplace computer device 210 (e.g., the insurance lead marketplace computer device 110). In some cases, the insurance leads may be provided in real-time, in other words, the insurance lead may be immediately transferred to the insurance lead marketplace computer device 210, stored in the data repository 214, and made available to the one or more insurance agent and/or agencies 250. Some insurance leads may be provided as a group and transferred to the insurance lead marketplace computer device 210 as a group before being stored in the data repository 214. In some cases, the insurance lead suppliers 242 may be invited to participate in the insurance lead marketplace system by the insurance provider 220, where the insurance provider 220 may rate the insurance lead suppliers 240 according to specified criteria.

For example, the insurance provider 220 may request information about a projected number of insurance leads over a specified time period (e.g., 1000 leads/month) and/or a projected range of insurance leads received over the time period (e.g., between about 500 leads and about 1000 leads per month, etc.) capable of being provided by the insurance lead supplier 240 and/or a cost associated with each of the leads. In some cases, the insurance lead suppliers 240 may be tempted to over-predict the amount of leads that they would be capable of providing. In such cases, some insurance lead suppliers 240 may resort to duplicating entries, fabricating entries or otherwise fraudulently enhancing the number of leads supplied to the insurance lead marketplace system 100. To solve this potential problem, the insurance lead marketplace computer device 210 may be configured to obtain feedback about the different lead provided by each of the different insurance lead suppliers 240. For example, a record of insurance leads provided by each of the different insurance lead providers 240 may be stored in the data repository 214. This data may be compared with feedback received from different insurance agents and/or agencies 250 that purchase the insurance leads from the insurance lead marketplace. In some cases, the insurance lead feedback may be provided from information determined by the insurance lead marketplace computer device 210, such as whether a lead was purchased by an agent 250, how long the insurance lead remained un-purchased, and/or a quality tier assigned to each particular insurance lead.

In some cases, the different insurance lead suppliers 240 may be rated and/or evaluated using one or more different parameters that may be calculated by the insurance lead marketplace computer device 210. For example, the insurance lead marketplace computer device 210 may analyze historical information associated with one or more past insurance leads to determine parameters that may be used to qualify and/or rate the different insurance lead suppliers 240. These parameters may include a capability to deliver a specified number (e.g., 10, 20, 30, etc.) of unique insurance leads of a particular type (e.g., an automobile insurance lead, a homeowners insurance lead, a life insurance lead, a renters insurance lead, a boat insurance lead, and the like) per month, a lead rejection rate of less than or equal to a specified percentage (e.g., less than or equal to 5%, less than or equal to 2%, etc.), a lead credit request rate of less than or equal to a specified percentage (e.g. less than or equal to 5%, less than or equal to 2%, etc.), a per lead cost of less than or equal to a specified cost (e.g., $5 per lead, $10 per lead, etc.), an ability to integrate with one or more different customer relationship management (CRM) platforms provide by different vendors (e.g., SAP, Oracle, Microsoft, Salesforce, Intuit, etc.), an ability to provide insurance leads for a specified geographic region (e.g., the United States, the United States and Canada, Canada, the Southwest, the Pacific Northwest, the Northeast, individual states and/or provinces, etc.), an ability to identify strong markets for one or more different insurance products, an ability to integrate with proprietary software developed by and/or for the insurance provider 220, an average lead contact rate of greater than or equal to a specified percentage (e.g., greater than or equal to 2%, greater than or equal to 5%, etc.), an average lead quote rate of greater than or equal to a specified percentage (e.g., greater than or equal to 2%, greater than or equal to 5%, etc.), and/or an average lead close rate of greater than or equal to a specified percentage (e.g., greater than or equal to 2%, greater than or equal to 5%, etc.).

The insurance lead marketplace computing device 210 may be configured to calculate a number of key performance indicators (KPIs) that may be used by the lead marketplace computing device 210 when determining a rating associated with each of the different insurance lead suppliers 240. Such KPIs may include a "lead volume", a "lead rejection rate", a "lead credit request rate", "lead identification (ID) verification, a "customer satisfaction" rating, an underwriting scoring, a "lead contact rate", a "lead quote rate, and/or a "lead close rate. The "lead volume" may correspond to whether an insurance lead supplier 240 met a specified minimum volume commitment (e.g., about 100 leads/week, about 1000 leads per month, etc.) and/or how often a particular insurance lead supplier 240 failed to meet the specified minimum volume commitment. The "lead rejection rate" may be associated with a number of leads that were rejected when they failed to meet the qualification criteria (e.g., categorized as the lowest qualification tier). For example, a name and address pair may not match a corresponding entry in the data repository 214, a duplicate insurance lead may be submitted within a specified time frame (e.g., about 1 week, about 15 days, etc.), or the like.

The "lead credit request rate" is associated with a percentage of leads that were re-submitted to the insurance lead marketplace for a refund by the insurance agent or agency 250. For example, an insurance agent or agency 250 may submit for a refund when a lead includes a disconnected phone number, is associated with a disinterested insurance consumer 230, or the like. "Lead ID verification" may correspond to an identification code associated with each insurance lead and may include information about the history and/or origin of the insurance lead. This information may allow the insurance lead marketplace computer device 210 to determine the age of a lead, the duration of the lead opportunity, and/or whether a particular lead was obtained as part of a promotion (e.g., a giveaway). Customer satisfaction may be associated with the satisfaction of the insurance lead supplier's customer (e.g., the insurance provider 220), the satisfaction of the insurance consumer 230 and/or the satisfaction of the customer of the insurance lead marketplace system 100 (e.g., the insurance agent or agency 250). The "lead contact rate" may correspond to a number of insurance leads that a purchasing insurance agent 230 was able to contact in a timely manner within a specified time period. The "lead quote rate" may correspond to a number of insurance leads that a purchasing insurance agent 230 was able to provide a quote for the insurance consumer's desired product(s) within a specified time period. The "lead close rate" may correspond to a number of insurance leads that a purchasing insurance agent 230 was able to close (e.g., provide an insurance product) in a timely manner within a specified time period.

The insurance lead marketplace computer device 210 may include a server 212 having at least one processor and a data repository 214. One or more insurance consumers 230 may desire some new and/or additional insurance coverage. When deciding on an insurance provider 220, the insurance consumers 230 may request quotation for a desired insurance product (e.g., health insurance, life insurance, homeowners insurance, fire insurance, rental insurance, automobile insurance, etc.) using the Internet, responding to a direct marketing campaign, completing a survey, calling an insurance agent directly, and the like. The memory device may be used for storing insurance leads obtained from the insurance lead suppliers 240, one or more rules for qualifying and/or categorizing insurance leads based on at least one insurance characteristic, or both.

The processor may be included in one or more servers 212 and, among other things, may be capable of providing insurance leads to a requesting agent and/or agency 250. The server 214 may be configured to receive one or more insurance leads from one or more insurance lead suppliers 240, analyze the received insurance leads to determine one or more characteristics of the received insurance leads, determine a quality associated with each insurance lead, wherein the quality of a particular insurance lead is at least dependent on the age of that insurance lead, classify the insurance leads into tiers based on the quality of each insurance lead using one or more lead attributes, categorize the insurance leads within each tier using the rules and the determined characteristics, provide an interface to the requesting insurance agent 250, wherein the insurance agent 250 may select one or more lead characteristics to specify a desired insurance lead category and/or a desired lead tier and provide one or more leads that match the desired insurance lead category and/or the lead tier to the requesting insurance agent 250 based on the desired insurance lead category and/or desired lead tier. In some cases, the processor may be configured to determine information associated with an actual quality of each insurance lead based at least in part upon feedback received from the agent and revise the rules for qualifying and/or categorizing the insurance leads using the actual quality of one or more insurance leads provided to an agent.

In some cases, the insurance lead marketplace computing device 210 may store in the data repository 214, one or more rules and/or attributes for qualifying the insurance lead sources 240. The server 212 may be configured to qualify a particular insurance lead source using the rules for qualifying the insurance lead sources based at least in part upon the actual quality of the insurance leads provided by the particular lead source and/or one or more attributes stored in the data repository 214. For example, the server 212 of the insurance lead marketplace computer device 210 may be configured to classify the insurance leads received from the insurance lead suppliers 240 into two or more tiers. For example, an insurance lead assigned to a first tier (e.g. a "top" tier) may include attributes such as (1) an age between about 25 to about 60, (2) a long duration of being continuously insured (e.g., over 2 years, about 5 years, etc.), (3) is a homeowner, (4) has a superior credit rating (e.g., a "good" rating, an "excellent" rating), (5) owns two or more vehicles, (6) is a licensed driver (e.g., no suspended driver's license), (7) has no at-fault accidents, (8) no tickets, (9) has not been stopped and/or convicted of driving under the influence of alcohol or drugs, and (10) has not been required to reinstate his or her driver's license following an uninsured car accident and/or another traffic related offence (e.g., no SR-22 vehicle liability insurance document). In some cases, one or more differences to the above mentioned attributes may cause an insurance lead to be classified in a different, lower tier. For example, an insurance lead assigned to a second tier (e.g. a "standard" tier) may include attributes such as (1) an age between about 22 to about 60, (2) a short duration of being continuously insured (e.g., less than two years, about 1 year, etc.), (3) is not a homeowner, (4) has a good credit rating (e.g., a "good" rating), (5) owns one or more vehicles, (6) is a licensed driver (e.g., no suspended driver's license), (7) has no at-fault accidents, (8) up to 1 tickets, (9) has not been stopped and/or convicted of driving under the influence of alcohol or drugs, and (10) has not been required to reinstate his or her driver's license following an uninsured car accident and/or another traffic related offence (e.g., no SR-22 vehicle liability insurance document). Sometimes, one or more differences to the above mentioned attributes may cause an insurance lead to be classified in a different, lower tier. For example, an insurance lead assigned to a third tier (e.g. a "high risk" tier when one or more attributes include (1) an age between about 16 to about 60, (2) a short duration of being continuously insured (e.g., about 1 year, etc.) or currently uninsured, (3) is not a homeowner, (4) has a poor credit rating (e.g., a "poor" rating), (5) owns one vehicle or doesn't own a vehicle, (6) is not a licensed driver (e.g., has a suspended driver's license), (7) has 1 or more at-fault accidents, (8) over 1 ticket, (9) has been stopped and/or convicted of driving under the influence of alcohol or drugs, and (10) has been required to reinstate his or her driver's license following an uninsured car accident and/or another traffic related offence (e.g., no SR-22 vehicle liability insurance document).

In some cases, the insurance lead marketplace computer device may include a filter 216. The filter 216 may be used to filter one or more insurance leads before sending the leads to the agent. In some cases, the filter may be used to qualify the insurance leads. For example, the filter 216 may be configured to remove an insurance lead that (1) includes a name and that does not match an associated addresses (2) includes a known false name, (3) includes a known false address, and/or (4) is a duplicate of another insurance lead. In some cases, the removed leads may be returned to a particular insurance lead supplier 240. The removed leads and/or returned leads may be used when providing a rating of the particular insurance lead supplier 240, such as by using a count of insurance leads returned to that particular lead source.

In an example, the insurance lead marketplace system 200 may include a data repository 214 and an insurance lead marketplace computer device 212. The data repository 214 may include at least one non-transitory memory device, the data repository for storing one or more available insurance leads received from an insurance lead source 240. The insurance lead marketplace computer device 214 may be communicatively coupled to the data repository 214. The insurance lead marketplace computer device 212 may include a processor (e.g., the processor 103) configured to categorize the one or more insurance leads into quality tiers based on characteristics associated with the insurance leads. The insurance lead marketplace system 200 may include a user interface 218 that may be communicatively coupled to the data repository 214 and/or the insurance lead marketplace computer device 212. The user interface 218 may be located locally to the data repository 214 and/or the insurance lead marketplace computer device 212. In some cases, the user interface 218 may be located local to the insurance agent and/or agency 230. For example, the insurance agent and/or agency 230 may access the insurance lead marketplace via a network connection (e.g., the Internet, a LAN, a WAN, etc.). The user interface 218 may be configured to display one or more screens to facilitate a request from an insurance agent for one or more insurance leads based on one or more desired characteristics of the insurance leads. In some cases, the insurance lead marketplace computer device 212 may provide real-time verification of the insurance leads by determining a number of the available insurance leads that match characteristics specified in a request for insurance leads received via the user interface screen.

In some cases, the user interface is configured to display a screen presenting verified insurance leads requested by the insurance agent and/or agency 230 that match at least a portion of the desired characteristics. In some cases, if the insurance lead marketplace computing device determines that no insurance leads match the desired characteristics, the insurance lead marketplace computing device causes the user interface to display a screen having (1) no insurance leads, (2) a different set of leads and characteristics associated with the different set of leads, and/or suggest one or more characteristics to improve a search for desired insurance leads. The user interface 218 may be configured to display the one or more verified leads on a geographical map, such as to display a geographical region (e.g., a city, a county, a state, a country, etc.). In some cases, the geographical region may be represented by one or more zip codes, an area codes, a school districts, or the like. For example, a user may desire to view a number of leads within a specified distance from a location, such as an insurance agency office location. In such cases, an insurance agent may specify a distance and/or radius (e.g., within 10 miles) relative to specified location (e.g., a street address, a city, a zip code, an area code. etc.).

In some cases, the geographical map may include one or more topographical features and/or environmental features corresponding to an insurance risk. For example, the insurance leads may be presented as points on a geographical map. In some cases, a number of geographical features (e.g., a river, an ocean, a forest, a prairie, an earthquake fault line, etc.) that may be associated with a particular insurance risk (e.g., a flood, a storm surge, a fire, an earthquake, etc.). In some cases, historical environmental events may be noted on the geographical map, such as a storm track (e.g., a tropical storm, a hurricane), an earthquake damage radius, a tornado track, a flood plain, and the like. In some cases, known local environmental risks may be displayed, such as low lying areas prone to flooding during strong rainstorms (e.g., a 50 year storm, a hundred-year storm, and the like).

For example, an insurance agent and/or agency 230 may be presented one or more potential leads available for purchase according to criteria suggested by the insurance provider and/or selected by the insurance agent and/or agency. In some cases, the insurance provider 220 may determine a number of characteristics and/or criteria likely to produce an insurance lead that are likely to purchase an insurance policy. For example, the insurance agent and/or agency 230, when signing up for and/or signing into the insurance lead marketplace system, may provide information about their capabilities in working with insurance customers. For example, the insurance agent and/or agency may provide information about language fluency (e.g., English, French, Spanish, Polish, etc.) that may be useful according to the demographics of a region. In other cases, the insurance agent and/or agency 230 may provide staffing information that may be indicative of the ability to service a number of insurance leads. For example, an insurance agent or agency 230 with a staff of five may be able to service thirty insurance leads in a week, while an insurance agent or agency 230 with a staff of 15 may be able to service 67 leads in a week. The insurance agent or agency 230 may provide the number of leads that they are capable of servicing. Sometimes, the insurance provider 220 may provide a suggested number of leads that they predict that the insurance agent and/or agency 230 can service over a specified time period, based on, for example, an analysis of historical information.

Figure 3:
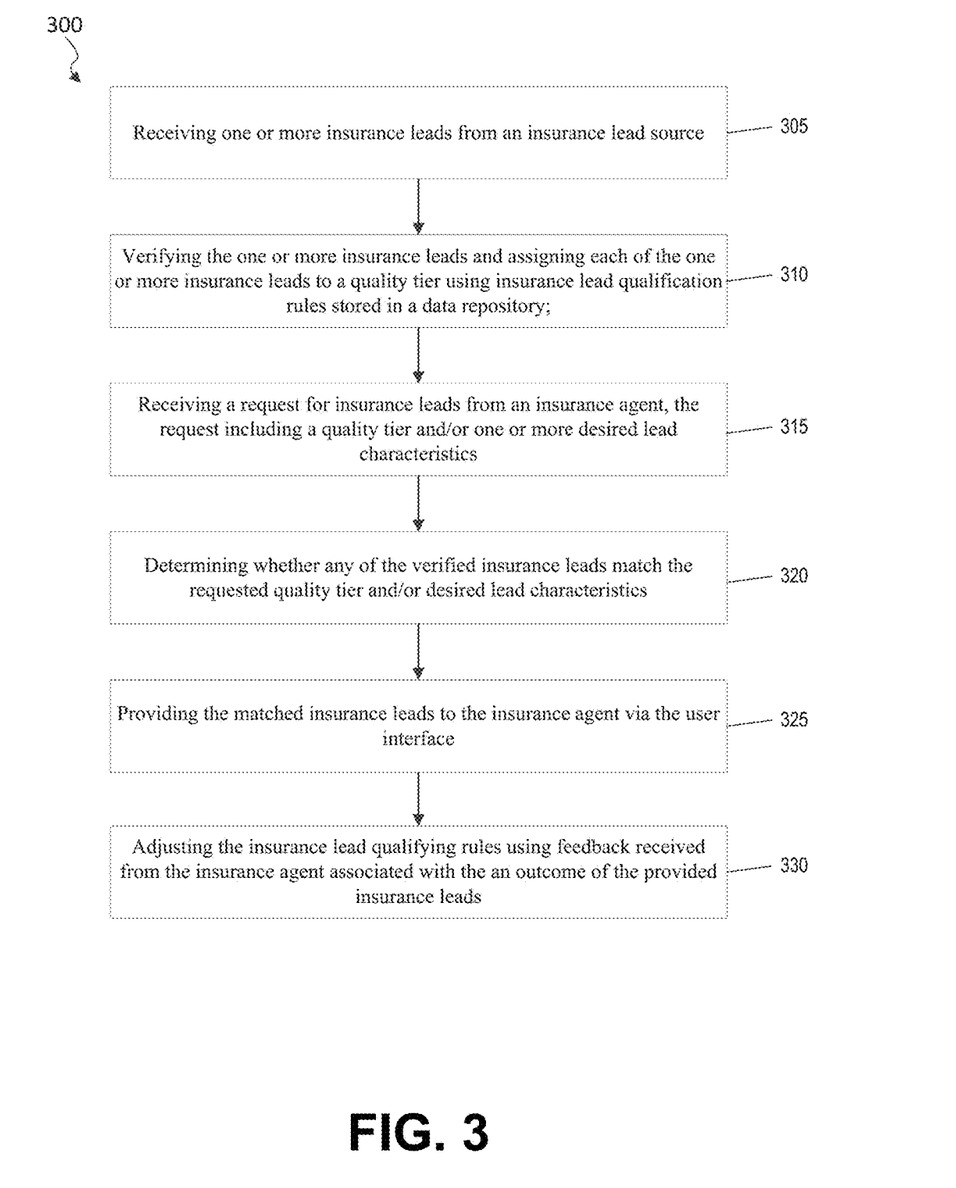
FIG. 3 shows an illustrative method for providing leads through an insurance lead marketplace system, according to one or more aspects of the disclosure.

FIG. 3 is a flow diagram illustrating an illustrative method 300 for providing an insurance lead (e.g., a qualified insurance lead) via the lead marketplace system 100 of FIGS. 1 and 2. For example, at 305, the insurance lead marketplace computing device 101 may receive one or more insurance leads from the insurance lead supplier. In some cases, the insurance lead supplier may provide the insurance lead in response to a request received from the insurance lead marketplace computing device 101. Sometimes, the insurance lead supplier, such as when the insurance lead supplier has been acknowledged as a trusted and/or qualified source, may provide insurance leads on a periodic basis and/or in real-time as the insurance leads are generated. At 310, one or more received insurance leads may be verified and or assigned to a particular quality tier using insurance lead qualification rules stored in a data repository, such as by the insurance lead marketplace computing device 101. For example, each insurance lead may be examined to determine whether the insurance lead is valid. To do so, the insurance lead computing device 101 may examine a name and/or address associated with the insurance lead to determine whether the name and address match, whether the name is associated with a known false name (e.g., "Mickey Mouse"), and/or whether the name is associated with a known false address (e.g. "1060 W. Addison Street, Chicago, Ill." when requesting homeowner insurance). In some cases, the name and/or address may be compared with information included in a database associated with current insurance customers. In such cases, the insurance lead may be marked as an improper new insurance lead and/or forwarded to the agent or agency that is currently providing insurance to the insurance customer.

At 315, at least one request for insurance leads may be received from an insurance agent. For example, an insurance agent may request an insurance lead via a screen (e.g., the screen 400 of FIG. 4) on a user interface of the terminal 141, 151, such as by selecting one or more desired quality tiers and/or desired lead characteristics to be associated with any provided insurance leads. The agent or agency may select the quality tiers and/or desired lead characteristics using one or more user interfaces, such as those shown in FIGS. 4 and 5. At 320, the insurance lead marketplace computing device 101 may determine whether any of the verified insurance leads match the requested quality tier and/or desired lead characteristics. If so, at 325, the insurance lead marketplace computing device 101 may provide the matched insurance leads to the insurance agent and/or agency as a graphical user interface screen, a printed report, a text message, an email, a voicemail message, and the like. If no verified insurance leads match the desired characteristics and/or quality tiers, the insurance lead marketplace computing device 101 may provide notification that no matches exist, a list of suggested characteristics and/or quality tiers and any matching insurance leads, and/or suggestions to improve the previous search. At 330, the insurance lead marketplace computing device 101 may adjust the insurance lead qualifying rules using feedback received from the insurance agent and/or agency associated with an outcome for individual verified leads received from the insurance lead marketplace system 100. In some cases, the method 300 may further include determining a price associated with each of the one or more insurance leads, the price corresponding to the quality tier of each insurance lead and/or one or more characteristics of the insurance lead.

Figure 4:
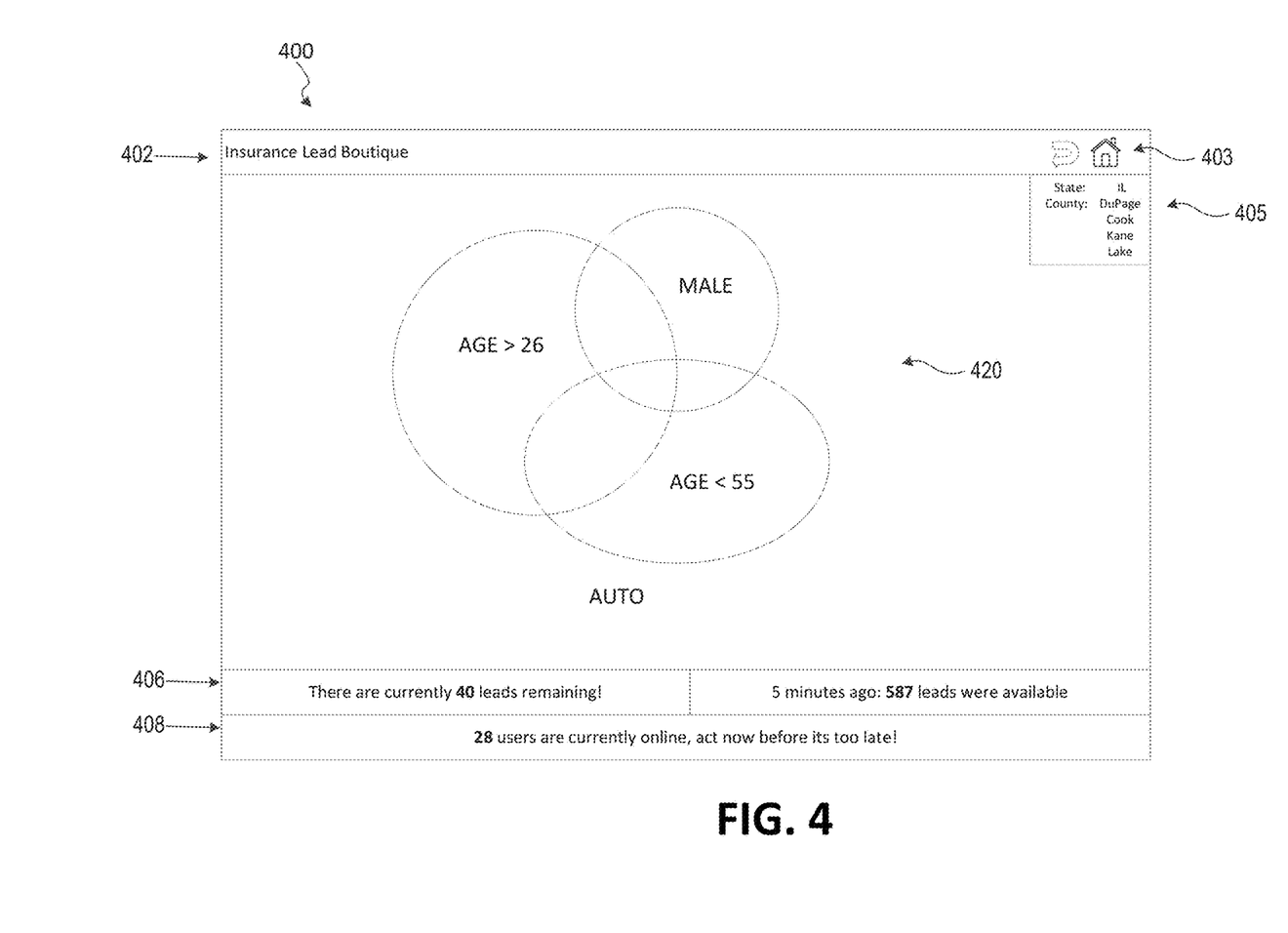
FIGS. 4 and 5 show illustrative user interface screens for providing one or more insurance leads to an insurance agent, according to one or more aspects of the disclosure.
Figure 5:
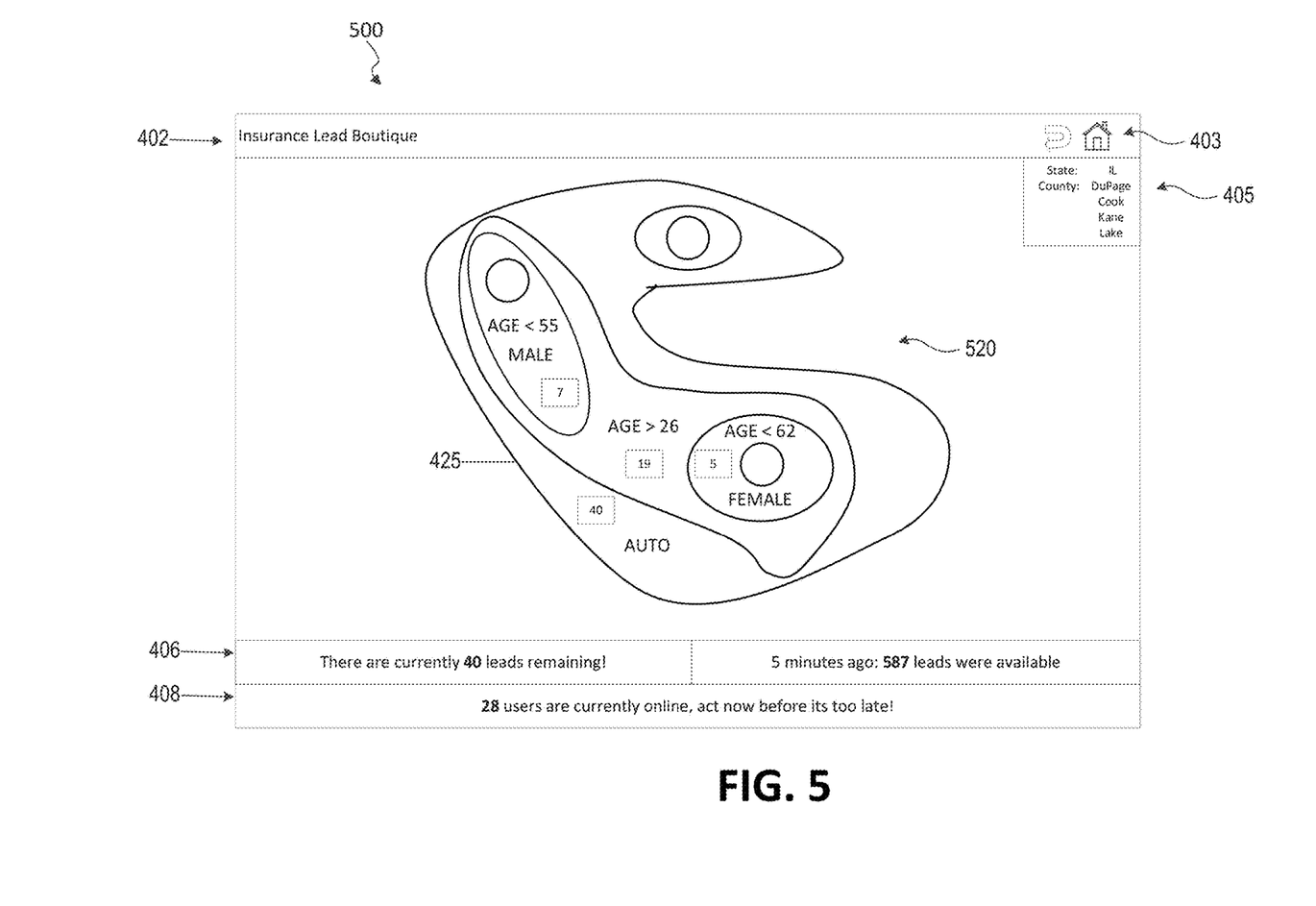

FIGS. 4 and 5 show illustrative user interface screens 400, 500 for providing one or more insurance leads to an insurance agent, according to one or more aspects of the disclosure. For example, the illustrative user screens 400, 500 may be configured for presenting one or more insurance leads to a customer of the insurance lead marketplace system 200. The illustrative screens may include a title field 402 that may include information, navigation buttons 403, and/or menu items (not shown) to allow a user to more easily navigate and/or interact with the insurance lead marketplace system. A display field 404 may be used to graphically and/or textually display insurance leads made available to the insurance agent and/or agency for purchase within a particular are (as shown in field 405). For example, the leads may be presented in one or more formats (e.g., a text list, a table, a bar graph, a Venn diagram, a geographical map, a topographical map, and the like). For example, the insurance leads may be displayed as a Venn diagram 420, showing a distribution of leads based on a number of desired characteristics. In this illustrative example, the Venn diagram 420 presents automobile insurance leads based on a number of desired and/or suggested characteristics (e.g., the age of a potential customer, the gender of a potential customer, and the like). In some cases, a topographical diagram 520 may be used to display insurance leads based on a number of criteria. The topographical bands 425 may be associated with a number of leads matching selected criteria. In FIG. 5, the topographical diagram may display a number of auto insurance leads that may match a number of criteria including age, and/or gender of the potential insurance customers. In the illustrative example, forty auto insurance leads may include nineteen over the age of 26, where seven were males under the age of 55 and five were females under the age of 62. One or more informational fields 406 may be provided to provide user information such as, for example, a number of leads available and/or a number of users that are active in the insurance lead marketplace system 200. A message field 408 may be used to provide further information to a user, such as suggested further search characteristics.

In some cases, the insurance lead marketplace system may be configured to provide one or more screens that may be used to create an interactive user environment. For example, one or more display screens may be used to provide a user discussion board or forum. In some cases, the display screens may be used for providing incentives to users. For example, a display screen and/or pop-up window may provide information about insurance leads provided at a discount, such as for older leads (e.g., over two days old) and/or for insurance products new to market in a particular region. In other cases, the message field 408 may be used to encourage and/or remind a user to purchase leads. For example, the message field may provide information about a purchase rate and/or a number of active users on the system interested in the same or similar leads. For example, the information fields 406 may display a remaining number of leads (e.g., 40) and/or a number of leads previously available (e.g., "five minutes ago, 587 leads were available"). The message field 408 may be used to encourage a user action. For example, the message field 408 may provide information about a number of other users interested in the same and/or similar insurance leads.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. An insurance lead marketplace computing device, comprising:
   a non-transitory memory device for storing one or more rules to categorize insurance leads based on at least one insurance characteristic; and
   a processor,
   wherein the memory device stores instructions that, when executed by the processor, causes the insurance lead marketplace computing device to:
   execute an insurance lead marketplace service using file-based integration of a security layer, the security layer comprising dedicated hardware at a same physical location as the insurance lead marketplace computing device;
   receive a request to access the insurance lead marketplace service from one or more insurance lead sources, wherein the request to access is received using a first communication security protocol of the security layer and does not require use of a second communication security protocol of the security layer;
   receive data for one or more insurance leads from the one or more insurance lead sources using second communication security protocol of the security layer;
   analyze the received insurance leads to determine one or more characteristics of the received insurance leads;
   determine a first quality associated with each insurance lead, wherein the first quality of a particular insurance lead is at least dependent on the age of that insurance lead;
   classify the insurance leads into tiers based on the first quality of each insurance lead;
   categorize the insurance leads within each tier using the one or more rules and the determined characteristics;
   after receiving the data for and categorizing the one or more insurance leads, provide an interface to an requesting insurance agent, the interface configured to receive selection of one or more insurance lead characteristics from the requesting insurance agent;
   determine whether any of the insurance leads match with the selected one or more insurance lead characteristics;
   in response to determining that one or more of the insurance leads match the selected one or more insurance lead characteristics:
      provide, through the security layer and using the first communication security protocol, data for one or more leads that match the selected one or more insurance lead characteristics;
      determine information associated with a second quality of each insurance lead based at least in part upon feedback received from the insurance agent; and
   revise at least one of the one or more rules for categorizing the insurance leads using the second quality of one or more insurance leads provided to an agent, the one or more rules configured to be applied in categorizing a plurality of additional insurance leads; and
   in response to determining that none of the insurance leads match the selected one or more insurance lead characteristics, generate and provide a suggestion for improving the one or more insurance lead characteristics selected by the insurance agent based on known characteristics matching one or more of the insurance leads.

2. The insurance lead marketplace computing device of claim 1, the memory further storing one or more rules for qualifying the insurance lead sources and wherein the processor is further configured to qualify a particular insurance lead source using the rules for qualifying the insurance lead sources based at least in part upon the second quality of the insurance leads provided by the particular lead source.

3. The insurance lead marketplace computing device of claim 2, wherein a particular lead source is qualified based on insurance leads that purchase insurance or insurance leads that respond to communication from the agent.

4. The insurance lead marketplace computing device of claim 1 further comprising a filter, wherein the filter filters the insurance leads before sending the leads to the agent.

5. The insurance lead marketplace computing device of claim 4, wherein the filter is configured to remove an insurance lead that satisfies at least one of the following conditions: (1) includes a name and that does not match an associated addresses (2) includes a known false name, (3) includes a known false address, and (4) is a duplicate of another insurance lead.

6. The insurance lead marketplace computing device of claim 5, wherein the removed leads are returned to a particular lead source and wherein the processor is configured to provide a rating of the particular lead source using a count of insurance leads returned to that particular lead source.

7. The insurance lead marketplace computing device of claim 1, wherein the insurance lead marketplace computing device provides one or more insurance leads to the insurance agent based on the selected lead characteristics via an audio indicator or a visual indicator.

8. The insurance lead marketplace computing device of claim 7, wherein the visual indicator includes one or more of a printed report, an email, a text message, or a screen displayed on a user interface.

9. An insurance lead marketplace system, comprising:
- a data repository including at least one non-transitory memory device, the data repository storing one or more previously received and stored insurance leads received from an insurance lead source;
- an insurance lead marketplace computer device communicatively coupled to the data repository, the insurance lead marketplace computer device including a processor configured to execute an insurance lead marketplace service using file-based integration of a security layer, wherein data for the one or more received insurance leads is transmitted to and from the insurance lead marketplace computer device using a first communication security protocol of the security layer, wherein the insurance lead marketplace computer device is configured to categorize the one or more insurance leads into quality tiers based on characteristics associated with the insurance leads, and wherein requests to access the insurance lead marketplace service are received using a second communication security protocol of the security layer and does not require use of the first communication security protocol of the security layer;
- the security layer, the security layer comprising dedicated hardware, different from the insurance lead marketplace computer device, and housed at a same physical location as the insurance lead marketplace computing device; and
- a user interface communicatively coupled to the data repository and the insurance lead marketplace computer device, the user interface configured to display one or more screens of the insurance marketplace service to facilitate a request from an insurance agent for insurance leads based on one or more selected characteristics of the insurance leads; and
- wherein the insurance lead marketplace computer device is configured to provide real-time verification of the insurance leads by determining a number of the received insurance leads that match characteristics specified in a request for insurance leads received via the user interface.

10. The insurance lead marketplace system of claim 9, wherein the user interface is configured to display a screen presenting verified insurance leads requested by the insurance agent that match at least a portion of the selected characteristics.

11. The insurance lead marketplace system of claim 10, wherein, if the insurance lead marketplace computing device determines that no insurance leads match the selected characteristics, the insurance lead marketplace computing device is configured to cause the user interface to display a screen having (1) no insurance leads, (2) a different set of leads and characteristics associated with the different set of leads, or (3) suggestions for one or more selected characteristics to improve a search for insurance leads.

12. The insurance lead marketplace system of claim 10, wherein the one or more verified leads are presented on a geographical map.

13. The insurance lead marketplace system of claim 12, wherein the geographical map includes one or more topographical or environmental features corresponding to an insurance risk.

14. The insurance lead marketplace system of claim 10, wherein the one or more verified leads are presented in one or more graphical diagrams.

15. The insurance lead marketplace system of claim 14, wherein the one or more verified leads are presented in a topographical Venn diagram.

16. The insurance lead marketplace system of claim 9, wherein one or more insurance agents are invited to use the insurance lead marketplace system and log into the insurance lead marketplace system using a screen displayed on the user interface.

17. A process for providing qualified insurance leads to an insurance agent, comprising:
- executing, by an insurance lead marketplace computing device, an insurance lead marketplace service using file-based integration of a security layer, the security layer comprising dedicated hardware housed at a same physical location as the insurance lead marketplace computing device;
- receiving, by the insurance lead marketplace computing device and through a first communication security protocol of the security layer, a request to access the insurance lead marketplace service from one or more insurance lead sources;
- receiving and storing, at the insurance lead marketplace computing device, one or more insurance leads from an insurance lead source through the insurance lead marketplace and the file-based integrated security layer;
- verifying, by the insurance lead marketplace computing device, the one or more insurance leads and assigning each of the one or more insurance leads to a quality tier using insurance lead qualification rules stored in a data repository;
- after receiving, storing, and verifying the one or more insurance leads, receiving, via a user interface, a request for insurance leads from an insurance agent, the request including one or more selected lead characteristics;
- determining, by the insurance lead marketplace computing device, that one or more of the verified insurance leads matches the selected lead characteristics;
- responsive to the determining, providing the matched one or more of the verified insurance leads to the insurance agent via the user interface using a file-based second communication security protocol of the security layer, without use of the first communication security protocol;
- adjusting, by the insurance lead marketplace computing device, the insurance lead qualifying rules using feedback received from the insurance agent associated with an outcome of the provided insurance leads.

18. The process of claim 17, further comprising determining a price associated with each of the one or more insurance leads, the price corresponding to a quality tier of each insurance lead.

19. The process of claim 18, wherein determining the price further depends on one or more characteristics of each insurance lead.

* * * * *

UNITED STATES PATENT AND TRADEMARK OFFICE
CERTIFICATE OF CORRECTION

Page 1 of 2

PATENT NO. : 10,489,798 B1
APPLICATION NO. : 14/457763
DATED : November 26, 2019
INVENTOR(S) : Madeyski It is certified that error appears in the above-identified patent and that said Letters Patent is hereby corrected as shown below:

In the Specification

Column 8, Detailed Description, Line 24:
Delete "110)." and insert --100).--

Column 8, Detailed Description, Line 33:
Delete "242" and insert --240--

Column 10, Detailed Description, Line 11:
Delete "230" and insert --250--

Column 10, Detailed Description, Line 14:
Delete "230" and insert --250--

Column 10, Detailed Description, Line 18:
Delete "230" and insert --250--

Column 10, Detailed Description, Line 39:
Delete "214" and insert --212--

Column 12, Detailed Description, Line 3:
Delete "212." and insert --210.--

Column 12, Detailed Description, Line 7:
Delete "214" and insert --210--

Column 12, Detailed Description, Line 9:
Delete "212" and insert --210--

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,489,798 B1

Column 12, Detailed Description, Line 16:
Delete "212." and insert --210.--

Column 12, Detailed Description, Line 18:
Delete "212." and insert --210.--

Column 12, Detailed Description, Line 20:
Delete "230." and insert --250.--

Column 12, Detailed Description, Line 21:
Delete "230" and insert --250--

Column 12, Detailed Description, Line 28:
Delete "212" and insert --210--

Column 12, Detailed Description, Line 34:
Delete "230" and insert --250--

Column 13, Detailed Description, Line 3:
Delete "230" and insert --250--

Column 13, Detailed Description, Line 11:
Delete "230," and insert --250,--

Column 13, Detailed Description, Line 18:
Delete "230" and insert --250--

Column 13, Detailed Description, Line 21:
Delete "230" and insert --250--

Column 13, Detailed Description, Line 23:
Delete "230" and insert --250--

Column 13, Detailed Description, Line 24:
Delete "230" and insert --250--

Column 13, Detailed Description, Line 28:
Delete "230" and insert --250--

Column 14, Detailed Description, Line 39:
Delete "404" and insert --405--